US012020068B2

(12) United States Patent
MacNamara et al.

(10) Patent No.: US 12,020,068 B2
(45) Date of Patent: Jun. 25, 2024

(54) MECHANISM TO AUTOMATICALLY PRIORITIZE I/O FOR NFV WORKLOADS AT PLATFORM OVERLOAD

(71) Applicant: Intel Corporation, Santa Clara, CA (US)

(72) Inventors: Chris MacNamara, Limerick (IE); Amruta Misra, Bangalore (IN); John Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 17/022,332

(22) Filed: Sep. 16, 2020

(65) Prior Publication Data
US 2020/0409755 A1   Dec. 31, 2020

(51) Int. Cl.
| | |
|---|---|
| G06F 9/48 | (2006.01) |
| G06F 9/455 | (2018.01) |
| G06F 12/0875 | (2016.01) |
| G06F 13/20 | (2006.01) |

(52) U.S. Cl.
CPC ........ *G06F 9/4893* (2013.01); *G06F 9/45558* (2013.01); *G06F 12/0875* (2013.01); *G06F 13/20* (2013.01); *G06F 2212/1016* (2013.01)

(58) Field of Classification Search
CPC .................................................... G06F 9/4893
See application file for complete search history.

(56) References Cited

U.S. PATENT DOCUMENTS

| | | |
|---|---|---|
| 2014/0068293 A1 | 3/2014 | Man et al. |
| 2016/0147291 A1 | 5/2016 | Thomas et al. |
| 2016/0179173 A1 | 6/2016 | Eastep et al. |
| 2020/0097059 A1* | 3/2020 | Ou Yang ............... G06F 1/3206 |
| 2020/0287813 A1 | 9/2020 | Kutch et al. |

(Continued)

OTHER PUBLICATIONS

E. Shamsa, A. Kanduri, A. M. Rahmani, P. Liljeberg, A. Jantsch and N. Dutt, "Goal-Driven Autonomy for Efficient On-chip Resource Management: Transforming Objectives to Goals," 2019 Design, Automation & Test in Europe Conference & Exhibition (DATE), Florence, Italy, 2019, pp. 1397-1402 (Year: 2019).*

(Continued)

*Primary Examiner* — Charlie Sun
(74) *Attorney, Agent, or Firm* — Compass IP Law PC

(57) ABSTRACT

Methods to automatically prioritize input/output (I/O) for Network Function Virtualization (NFV) workloads at platform overload and associated apparatus and mechanisms. During lab or runtime workload operations, various platform telemetry data are collected and analyzed to determine whether a current workload is uncore-sensitive—that is, sensitive to operations involving utilization of the uncore circuitry such as I/O-related operations, memory bandwidth utilization, LLC utilization, network traffic, core-to-core traffic etc. For uncore sensitive workloads, upon detection of a platform overload condition such as a thermal load approaching a TDP limit, the uncore circuitry is prioritized over the core circuitry such that the frequency of the core is reduced first. A closed-loop feedback mechanism is used to adjust the frequencies of the core and uncore under various workload conditions. The mechanism enables I/O throughput to be maintained for NFV workloads, while reducing the processor thermal load.

24 Claims, 9 Drawing Sheets

(56) References Cited

U.S. PATENT DOCUMENTS

2020/0334176 A1\* 10/2020 Li .................. G06F 13/1663
2020/0409755 A1   12/2020 Macnamara et al.

OTHER PUBLICATIONS

Sundriyal, Vaibhav, et al. "Uncore frequency scaling vs dynamic voltage and frequency scaling: A quantitative comparison." Society for Modeling & Simulation International, SpringSim-HPC (2018). (Year: 2018).\*

International Search Report and Written Opinion for PCT Patent Application No. PCT/US21/45243, dated Nov. 16, 2021, 12 pages.

Neha Gholkar et al., 'Uncore Power Scavenger. A Runtime for Uncore PowerConservation on HPC Systems', SC'19, Nov. 17-22, 2019, Denver, USA, ACM ISBN 978-1-4503-6 229-0/19/I I, pp. 1-12.

Notice of Docketing, Federal Circuit Docket No. 2022-1611, Federal Circuit Short Caption: In re: Google LLC, Originating Case U.S. Appl. No. 15/487,516, Date of Docketing: Apr. 11, 2022, 33 pages.

United States Court of Appeals for the Federal Circuit, Appeal No. 2022-1611, In re: Google LLC, USPTO Director's Unopposed Motion for Remand, Jul. 26, 2022, 6 pages.

\* cited by examiner

MECHANISM TO AUTOMATICALLY PRIORITIZE I/O FOR NFV WORKLOADS AT PLATFORM OVERLOAD

BACKGROUND INFORMATION

In recent years there has been tremendous growth in the usage of so-called "cloud-hosted" services. Examples of such services include e-mail services provided by Microsoft (Hotmail/Outlook online), Google (Gmail) and Yahoo (Yahoo mail), productivity applications such as Microsoft Office 365 and Google Docs, and Web service platforms such as Amazon Web Services (AWS) and Elastic Compute Cloud (EC2) and Microsoft Azure. Cloud-hosted services and cloud-based architectures are also widely used for telecommunication networks and mobile services.

Cloud-hosted services including Web services, Software as a Service (SaaS), Platform as a Service (PaaS), and Infrastructure as a Service (IaaS). Cloud Service Providers (CSP) have implemented growing levels of virtualization in these services. For example, deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications (including virtual network functions (VNFs), network service providers can gain flexibility in network configuration, enabling significant benefits including optimization of available bandwidth, cost savings, and faster time to market for new services.

In addition to cloud-hosted services, high performance computing (HPC) has also seen substantial growth. Cloud-hosted services and HPC environments are typically implemented using data centers that have a very large number of compute resources, implemented in racks of various types of servers, such as blade servers filled with server blades and/or modules and other types of server configurations (e.g., 1 U, 2 U, and 4 U servers). Due to high power densities in these installations, performance is generally limited by thermal loading limits rather than processor performance.

For example, processors in high-performance servers generally are operated in view of thermal design power (TDP) specifications. In some installations, there is a nominal TDP power limit (e.g., 185 (W)atts), and a turbo mode limitation (e.g., 225 W). Generally, turbo mode can be used for shorter durations and is restricted to a portion of processors in a given thermal envelope. For instance, for a blade server installation in which 8-12 blade servers are installed in a chassis or drawer, only a portion of the processors may operate in turbo mode at any point in time. Depending on the processor power densities, airflow, cooling, and other considerations, some processors may need to be operated below TDP limits.

Power consumption for a processor is managed by adjusting the processor frequency. For earlier generations of processors, this was done by adjusting the processor frequency as a whole. Recently introduced processors are configured to enable the frequency of the processor cores and the frequency of the (generally) rest of the processor (e.g., circuitry external to the core referred to as the "uncore" herein) to be adjusted separately. The ability to use separate core and uncore frequencies is advantageous for NFV servers and the like, since they have higher uncore workloads than servers that are primarily used for their compute resources.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
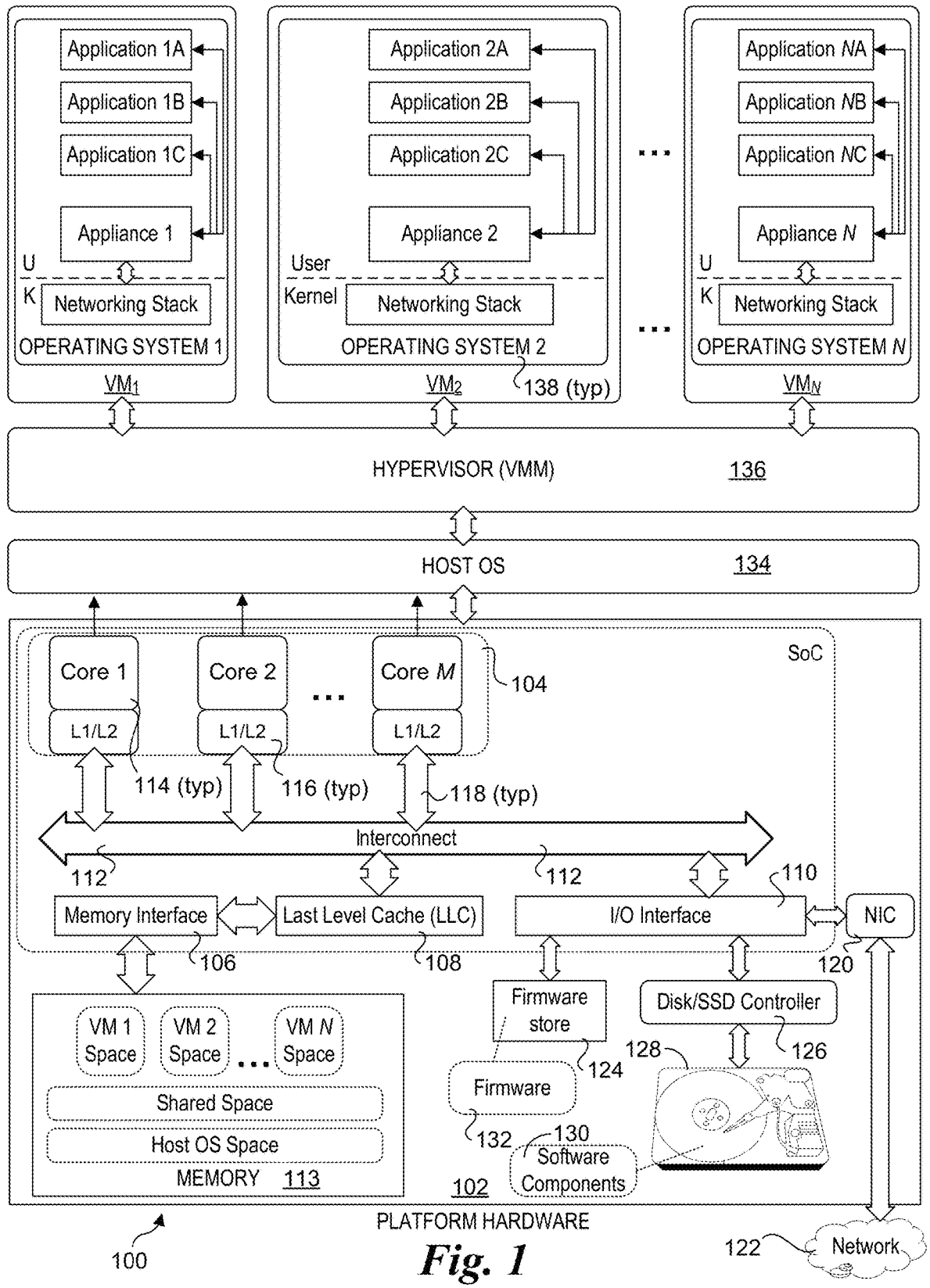
FIG. 1 is a schematic diagram illustrating an exemplary host platform configuration including platform hardware and various software-based components including NFV components.

Embodiments of methods to automatically prioritize input/output (I/O) for NFV workloads at platform overload and associated apparatus and mechanisms are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As used herein, the terms "virtual appliance," "virtual network appliance," "network appliance," or simply "appliance" may be used interchangeably. In addition, for the purpose herein, including the claims, any software-based appliance relating to Software Defined Networking or configured to implement Network Function Virtualization may more generally be referred to as a "virtual appliance," with the understanding that virtual network appliances include any network appliance or virtualized entity that is configured to implement Network Function Virtualization and/or operations relating to Software Defined Networking. Accordingly, the terms virtual appliance in the following description includes all NFV appliances, as well. Additionally, the terms "cacheline" and "cache line" may also be used interchangeably.

In accordance with aspects of the embodiments disclosed herein, I/O for NFV workloads are prioritized under platform overload conditions, such as when a processor thermal load approaches a TDP limit. Various platform telemetry data is collected and analyzed to determine whether a current workload is uncore-sensitive—that is, sensitive to operations involving utilization of the uncore circuitry such as I/O-related operations, memory bandwidth utilization, LLC utilization, network traffic, core-to-core traffic etc. For example, if the performance of the workload changes when a frequency of the uncore is changed relative to a frequency of the core, the workload is uncore-sensitive (that is, the circuitry in the uncore is sensitive to the workload). Conversely, if changing the uncore frequency relative to the core frequency does not affect performance, then the workload is non uncore-sensitive. Under the foregoing, the frequency adjustments are relatively small—of course if you reduced the uncore frequency by a significant margin relative to the core (e.g., 2× or more) you will see reduced performance for most workloads whether or not the workloads are, in fact, uncore-sensitive as used herein.

For uncore-sensitive workloads, upon detection of a platform overload condition such as a thermal load approaching the TDP limit, the uncore circuitry is prioritized over the core circuitry such that the frequency of the core is reduced first. Other relative frequency adjustments (e.g., adjustment of the core vs. the uncore) may also be made in view of whether the workload is uncore-sensitive or not. For example, for uncore-sensitive workloads under which a processor is below a TDP limit, in some embodiments the uncore frequency may be increased while maintaining the frequency of the core.

FIG. 1 shows an exemplary host platform configuration 100 including platform hardware 102 and various software-based components including NFV components. Platform hardware 102 includes a central processing unit (CPU) 104 coupled to a memory interface 106, a last level cache (LLC) 108 and an input/output (I/O) interface 110 via an interconnect 112. In some embodiments, all or a portion of the foregoing components may be integrated on a System on a Chip (SoC). Memory interface 106 is configured to facilitate access to system memory 113, which will usually be separate from the SoC.

CPU 104 includes a core portion including M processor cores 116, each including a local level 1 (L1) and level 2 (L2) cache. Optionally, the L2 cache may be referred to as a "middle-level cache" (MLC). As illustrated, each processor core 116 has a respective connection 118 to interconnect 110 and operates independently from the other processor cores.

For simplicity, interconnect 110 is shown as a single double-ended arrow representing a single interconnect structure; however, in practice, interconnect 110 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for I/O access and employ non-coherent domains. The interconnect structure on the processor or SoC may include any existing interconnect structure, such as buses and single or multi-lane serial point-to-point, ring, or mesh interconnect structures.

I/O interface 110 is illustrative of various I/O interfaces provided by platform hardware 102. Generally, I/O interface 110 may be implemented as a discrete component (such as an ICH (I/O controller hub) or the like), or it may be implemented on an SoC. Moreover, I/O interface 110 may also be implemented as an I/O hierarchy, such as a Peripheral Component Interconnect Express (PCIe™) I/O hierarchy. I/O interface 110 further facilitates communication between various I/O resources and devices and other platform components. These include a Network Interface Controller (NIC) 120 that is configured to facilitate access to a network 122, and various other I/O devices, which include a firmware store 124, a disk/SSD controller 126, and a disk drive 128. More generally, disk drive 128 is representative of various types of non-volatile storage devices, including both magnetic- and optical-based storage devices, as well as solid-state storage devices, such as solid state drives (SSDs) or Flash memory.

The multiple cores 114 of CPU 104 are employed to execute various software components 130, such as modules and applications, which are stored in one or more non-volatile storage devices, such as depicted by disk drive 128. Optionally, all or a portion of software components 130 may be stored on one or more storage devices (not shown) that are accessed via a network 122

During boot up or run-time operations, various software components 130 and firmware 132 are loaded into system memory 113 and executed on cores 114 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 102, firmware 132 will be loaded and configured in system memory 113, followed by booting a host operating system (OS) 138. Subsequently, a hypervisor 136 (or VMM), which may generally comprise an application running on host OS 134, will be launched. Hypervisor 136 may then be employed to launch various virtual machines, $VM_{1-N}$, each of which will be configured to use various portions (e.g., address spaces) of system memory 113. In turn, each virtual machine $VM_{1-N}$ may be employed to host a respective operating system $138_{1-N}$.

During run-time operations, hypervisor 136 enables reconfiguration of various system resources, such as system memory 113, cores 114, and disk drive(s) 128. Generally, the virtual machines provide abstractions (in combination with hypervisor 136) between their hosted operating system and the underlying platform hardware 102, enabling the hardware resources to be shared among $VM_{1-N}$. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 136.

As further illustrated in FIG. 1, each operating system includes a kernel space and a user space, both of which are implemented as memory spaces in system memory 113. The kernel space is protected and used to run operating system kernel components, including a networking stack. Optionally, the networking stack will be in the user space. Meanwhile, an operating system's user space is used to run user applications, as depicted by Appliances 1, 2, and N, and Applications 1A-C, 2A-C, and NA-C.

Generally, Appliances 1, 2, and N are illustrative of various SDN or NFV appliances that may run on virtual machines on platform hardware 102. For simplicity, each $VM_{1-N}$ is depicted as hosting a similar set of software applications; however, this is merely for illustrative purposes, as the VMs for a given platform may host similar applications, or may host different applications. Similarly, each $VM_{1-N}$ may host a single virtual network appliance (as shown), may host multiple virtual network appliances, or may not host any virtual network appliances.

Under SDN on a virtualized platform, data is passed between VMs over a virtual network. Generally, this may be implemented via virtual NICs for each VM, and a virtual switch in the hypervisor or VMM. Under a non-optimized conventional approach, the virtual switch is actually implemented in a manner similar to a physical switch, meaning the virtual switch includes input and output buffers and performs various packet flow operations. As with a physical switch, there are latencies that occur with each step of the data transfer sequence between the virtual NICs, which results in a substantial downgrade in performance.

In a virtualized environment including multiple VMs hosted on the same physical machine, the medium of communication is the memory subsystem. Therefore, expecting a very high throughput performance from the linkage of these VMs is not unrealistic. However, measurements from VMs on a typical modern server using a multitude of virtualization software reveals that the inter-VM communication performance is nowhere near what the memory subsystem could potentially achieve in terms of data throughput. For example, cloud workloads usually achieve a packet transfer rate of around one million packets per second between two VMs. Telco workloads, which typically use highly optimized software stacks and libraries, can usually achieve packet transfer rates of about ten million packets per second between two VMs.

NFV workloads may also involve handling of large amounts of network traffic using one or more network ports. [Add more]

Figure 2:
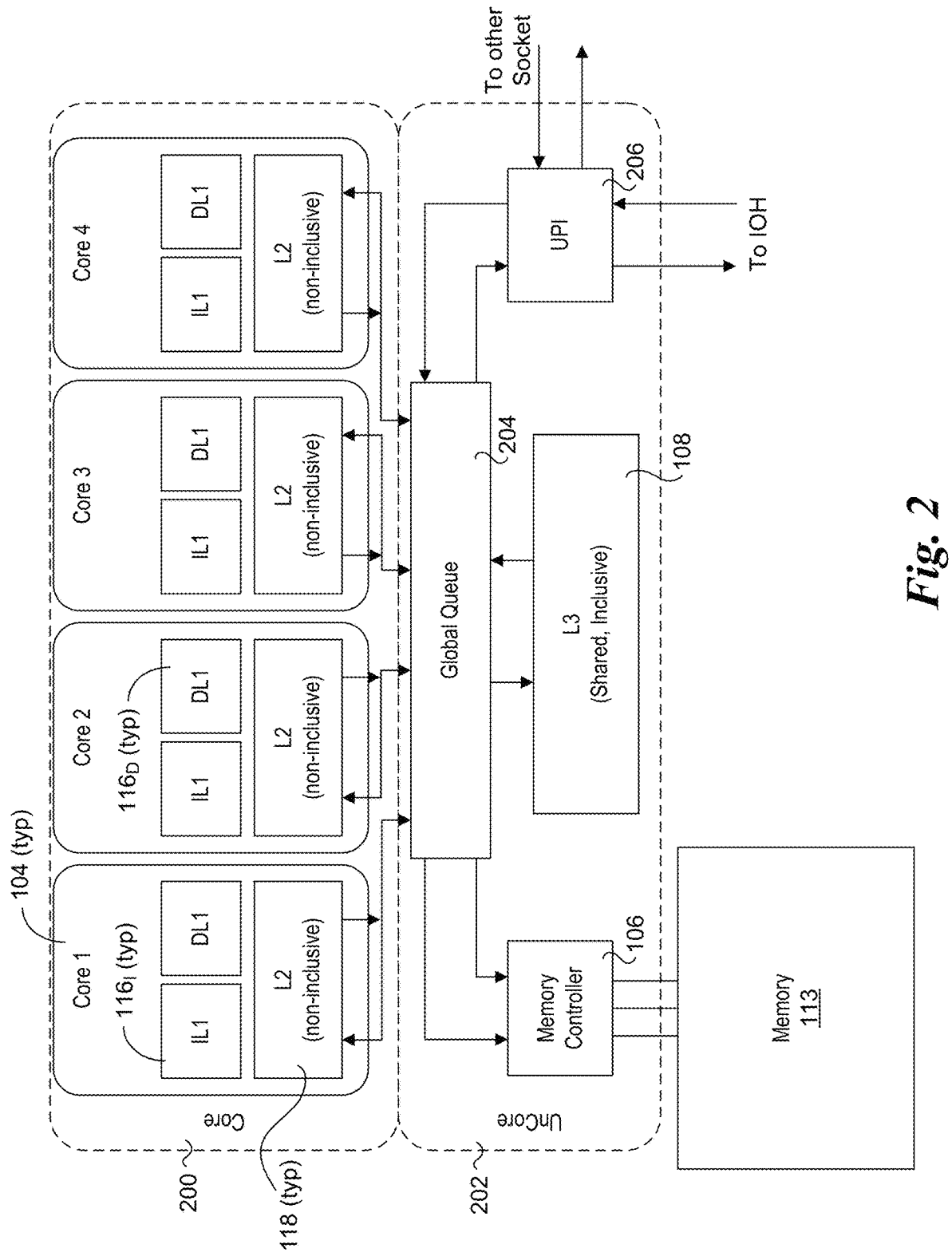
FIG. 2 is a schematic diagram illustrating an abstracted view of a memory coherency architecture employed by some embodiments of platforms herein.

FIG. 2 shows an abstracted view of a memory coherency architecture, according to one embodiment. Under this and similar architectures, such as employed by many Intel® processors, the L1 and L2 caches are part of a coherent memory domain under which memory coherency is managed by coherency mechanisms in the processor core 200. Each core 104 includes an L1 instruction (IL1) cache 1161, and L2 data cache (DL1) 116, and an L2 cache 118. L2 caches 118 are depicted as non-inclusive, meaning they do not include copies of any cachelines in the L1 instruction and data caches for their respective cores. As an option, L2 may be inclusive of L1, or may be partially inclusive of L1. In addition, L3 may be non-inclusive of L2. As yet a further option, L1 and L2 may be replaced by a cache occupying a single level in cache hierarchy.

Meanwhile, the LLC is considered part of the "uncore" 202, wherein memory coherency is extended through coherency agents, resulting in additional overhead and processor cycles. As shown, uncore 202 includes memory controller 106 coupled to external memory 113 and a global queue 204. Global queue 204 also is coupled to an L3 cache 108, and an Ultra Path Interconnect® (UPI) interface 206. L3 cache 108 (which functions as the LLC in this architecture) is inclusive, meaning that it includes a copy of each cacheline in the L1 and L2 caches.

As is well known, as you get further away from a core, the size of the cache levels increase, but so does the latency incurred in accessing cachelines in the caches. The L1 caches are the smallest (e.g., 32-64 KiloBytes (KB)), with L2 caches being somewhat larger (e.g., 256-640 KB), and LLCs being larger than the typical L2 cache by an order of magnitude or so (e.g., 8-16 MB). Of course, the size of these caches is dwarfed by the size of system memory (one the order of GigaBytes). Generally, the size of a cacheline at a given level in a memory hierarchy is consistent across the memory hierarchy, and for simplicity and historical references, lines of memory in system memory are also referred to as cachelines even though they are not actually in a cache. It is further noted that the size of global queue 204 is quite small, as it is designed to only momentarily buffer cachelines that are being transferred between the various caches, memory controller 106, and UPI interface 206.

Figure 4:
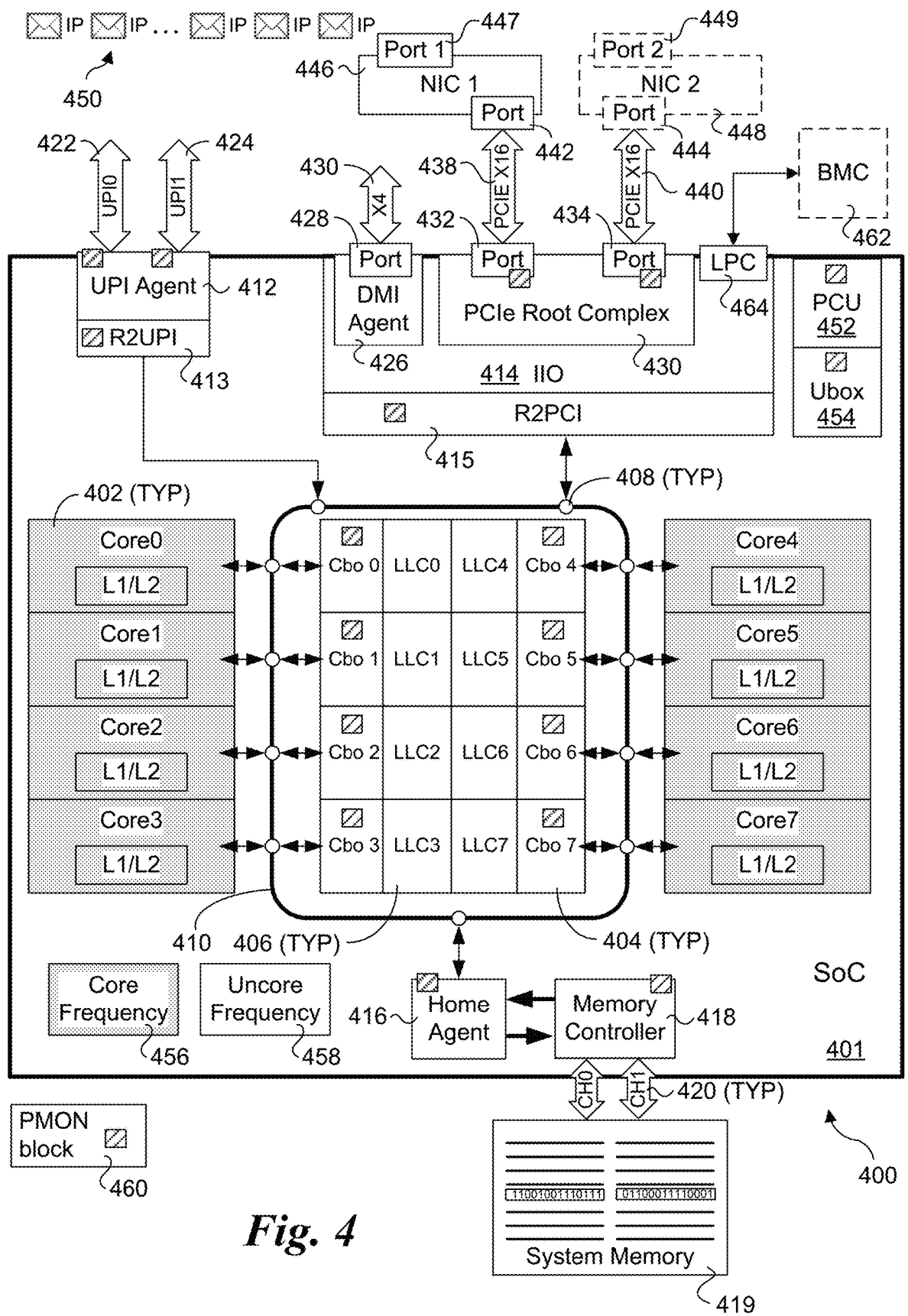
FIG. 4 is a schematic block diagram illustrating selected components of an exemplary processor and platform configuration via which aspects of the embodiments disclosed herein may be implemented.
Figure 5:
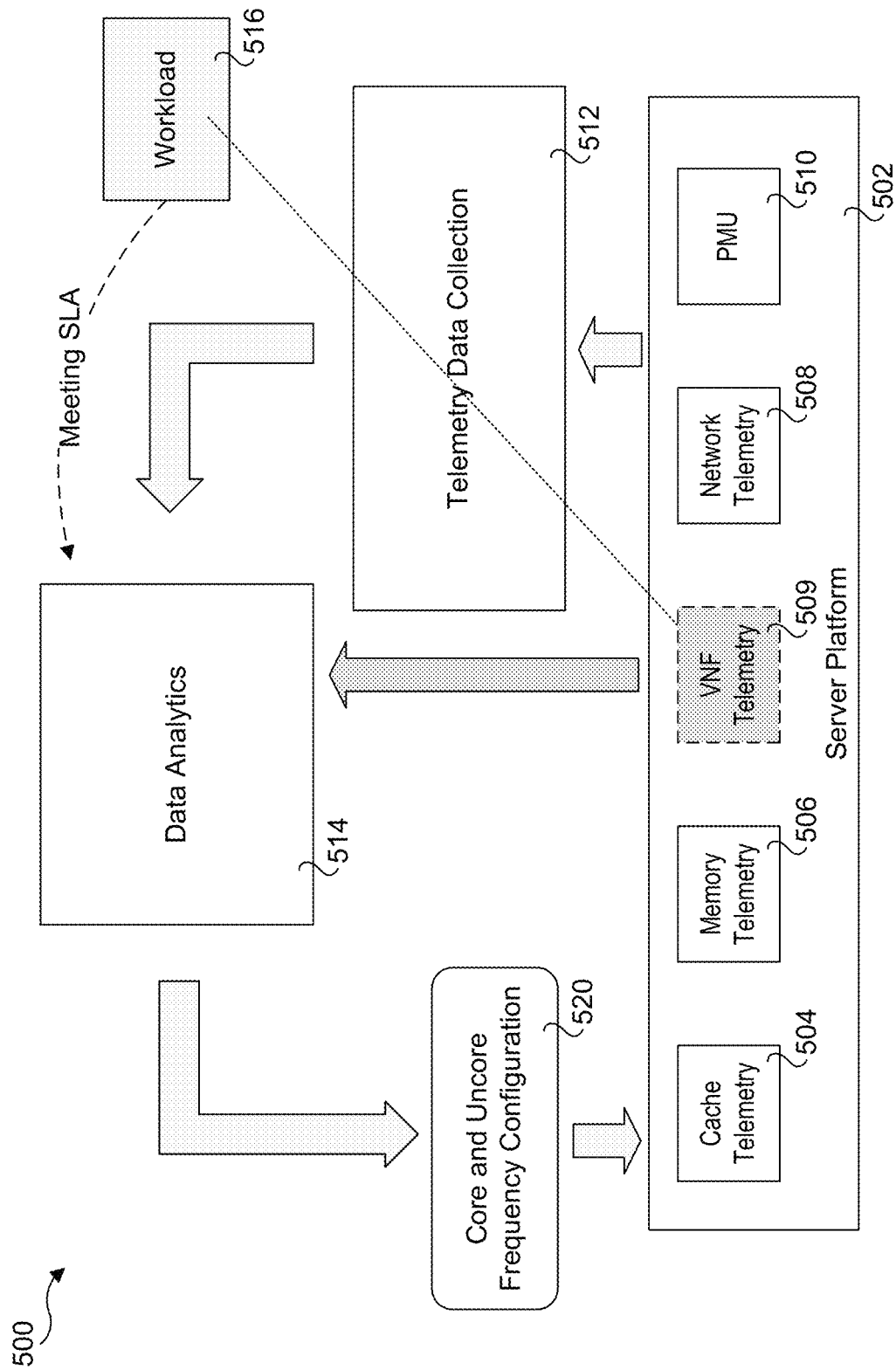
FIG. 5 is a schematic diagram illustrating an overview of a workload feedback mechanism facilitating a closed loop architecture for adjusting core and uncore frequencies, according to one embodiment.

As discussed above, the uncore generally includes circuitry on an SoC that is not port of the core circuitry (e.g., external to the core circuitry). In addition to the uncore components shown in FIG. 2, the uncore further includes the I/O hierarchy and associated components. Examples of further uncore circuitry are illustrated in FIGS. 4 and 5 and discussed below.

Figure 3:
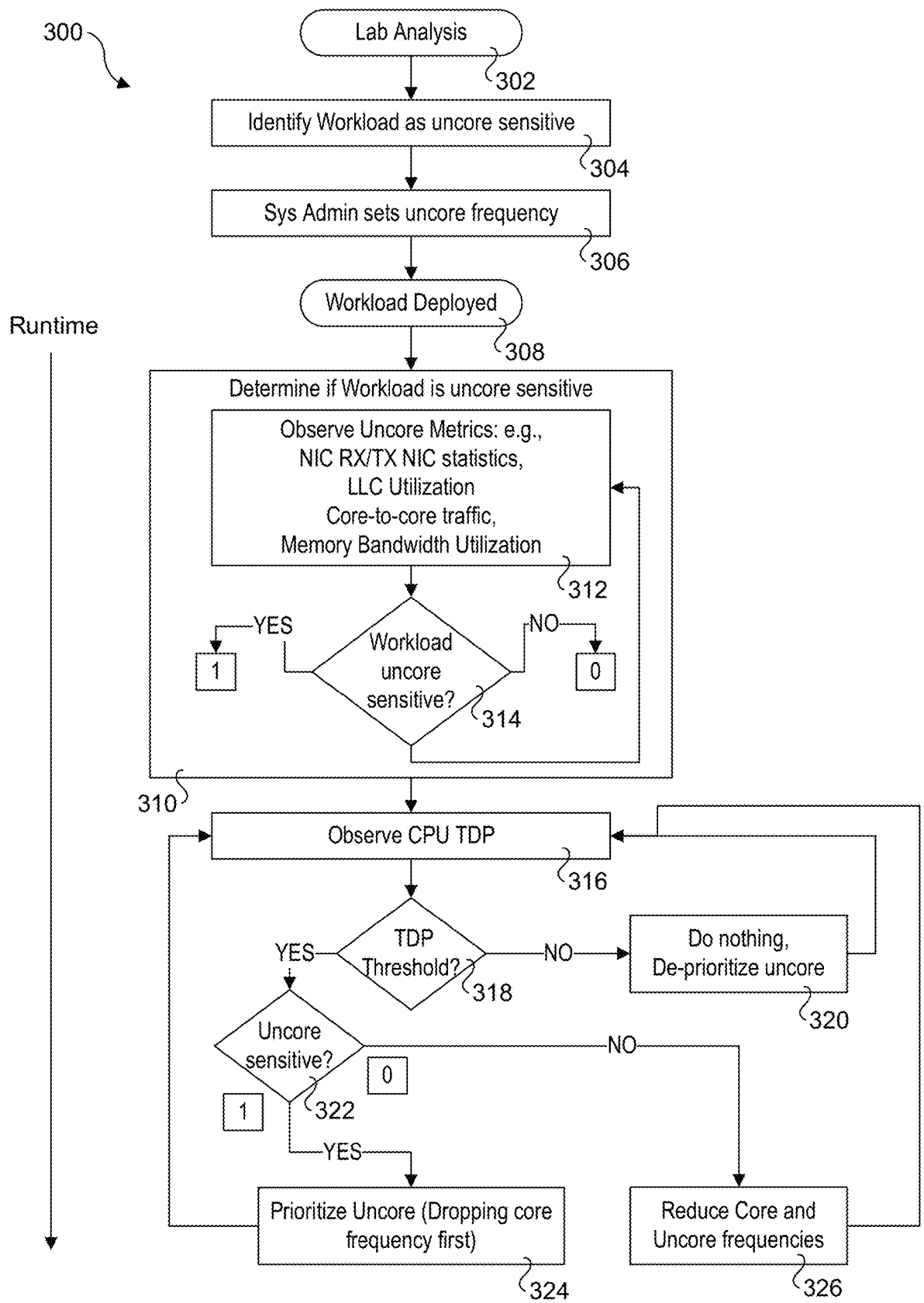
FIG. 3 is flowchart illustrating operations and logic for implementing a processor core and uncore frequency management scheme, according to one embodiment.

FIG. 3 shows a flowchart 300 illustrating operations and logic for implementing a processor core and uncore frequency management scheme, according to on embodiment. The process begins in a start block 302 where lab analysis is performed. Under aspects of lab analysis, different (actual or simulated) workloads are performed while monitoring processor performance metrics, telemetry data, etc. In connection with the lab analysis, workloads that are uncore sensitive are identified. An uncore sensitive workload means that the workload places a demand on the uncore circuitry that is higher than other (non-sensitive) workloads at a level where adjusting the frequency of the uncore relative to the core frequency provides a performance improvement. In a block 306, the system administrator or the like sets the uncore frequency to be used at the beginning of runtime operations using a like workload.

In a start block 308 the workload is deployed, and the remaining operations are performed during system runtime. In a block 310 and sub-blocks 312 and 314 uncore sensitive workloads are identified. As shown in sub-block 312, uncore performance metrics are observed, which may include but are not limited to NIC receive (RX) and transmit (TX) statistics, LLC utilization, core-to-core traffic, and memory bandwidth utilization. In sub-block 314 a determination is made to whether the workload is uncore sensitive. As shown by the loop back to sub-block 312 if the answer to sub-block 314 is NO, the operations of blocks 312 and 314 may be repeated on an ongoing basis.

As an option, a workload may be determined to be uncore sensitive outside of runtime operations (e.g., beforehand) based on known characteristics of the workload. For example, some types of NFV workloads are known to the uncore sensitive. Thus, the determination of whether a workload is uncore sensitive may be made outside of runtime operation or during runtime operations. Moreover, workload performance may change under various conditions such that a workload that is nominally determined (beforehand) to be uncore sensitive may be (re)determined to not be uncore sensitive during runtime operations.

Next, the logic proceeds to a block 316 in which the CPU TDP is observed. In a decision block 318 a determination is made to whether the TDP is reached. If not (answer is NO), the logic proceeds to a block 320 in which nothing is done (with respect to adjusting the processor core and uncore frequencies), with the uncore being de-prioritized. Conversely, if the answer to decision block 318 is YES, the logic proceeds to a decision block 322 in which a determination is made to whether the uncore is sensitive to the workload, as determined in decision block 314 above. If the answer is YES, the uncore is prioritized in a block 324. Prioritization of the uncore means the core frequency is dropped first (while holding the uncore frequency steady) when TDP for the CPU is reached. If the answer to decision block 322 is NO, the core and uncore frequencies are reduced in a block 326. As shown by the loops back to block 316, the operations of block 316, decision blocks 318 and 322, and blocks 320, 324 and 326 are performed on an ongoing basis for workloads that are identified as uncore sensitive.

Exemplary Platform/Computer Server and System Architectures

FIG. 4 shows a platform architecture 400 depicting an 8-core System on a Chip (SoC) processor 401 including processor cores 402 (labeled Core0-Core7), which are coupled to respective caching boxes 404 (labeled Cbo 0-7, also referred to as CBOXes) and LLCs 406 (labeled LLC0-LLC7) via nodes 408 on a ring interconnect 410. In the illustrated embodiment, LLCs 406 are implemented as LLC "slices" that are associated with respective processor cores, but may be shared across cores through the CBOXEs, which including coherent caching engines. In some embodiments, each processor core 402 includes a Level 1 (L1) and a Level 2 (L2) cache. The L1 cache includes an L1 instruction cache and an L1 data cache, while the L2 cache may be inclusive or non-inclusive. Also connected to ring interconnect 410 via corresponding nodes 408 are a UPI (Ultra Path Interconnect) agent 412, in Integrated Input/Output (IIO) block 414 and a Home Agent 416. UPI agent 412 is coupled to ring interconnect 410 via a Ring-to-UPI (R2UPI) interface 413, while IIO block 414 is coupled to ring interconnect 410 via a Ring-to-PCI (R2PCI) interface 415. Home agent 416 is coupled to a memory controller 418, which is used to access system memory 419 via one or more memory channels 420. UPI agent 412 is depicted as being coupled a pair of UPI links 422 and 424, enabling processor 401 to communicate with other platform components (not shown) via UPI.

In general, the components of processor 401 are interconnected via various types of interconnects, which are depicted as double-headed arrows for convenience. As discussed above, in one embodiment, processor 401 employs a ring interconnect 410. Optionally, the processor cores and related components and agents may be connected via an interconnect fabric (e.g., a 2D mesh interconnect). The interconnects may comprise point-to-point interconnects (e.g., UPI, PCIe, Intel on-chip System Fabric (IOSF), Open Core Protocol (OCP) etc.), as well as buses and other types of interconnect structures.

The IIO block in SoC processors is configured to perform I/O interface operations similar to those performed by an I/O chip or chipset in a conventional Northbridge/Southbridge platform architecture. However, rather than have these functions performed by a separate chip or chipset coupled to a processor via an external interconnect, they are now implemented by circuitry and logic embedded on the processor package (e.g., SoC) itself. This supports substantially higher bandwidths than available with conventional external interconnects, among other advantages.

Selected functional blocks are depicted for IIO block 414 in FIG. 4. These include a DMI agent and interface 426 including a port 428 coupled to an DMI x4 link 430. The IIO block includes a PCIe Root Complex 430 including PCIe root ports 432 and 434. PCIe root ports 432 and 434 provide PCIe interfaces to PCIe x16 links 438 and 440, which are respectively connected to PCIe ports 442 and 444 on a first NIC 446 (NIC 1) including a network port 447 and optional second NIC 448 (NIC 2) including a network port 449. NIC 446 is depicted as receiving a stream of packets 450 at a network port 447.

Processor 401 further includes a power control unit 452, a Ubox 454, a core frequency control block 456, an uncore frequency control block 458, and a plurality of performance monitor (PMON) blocks 460. Power control unit 452 is used to manage power aspects of processor 401, including putting the processor in different power states. Core frequency control block 456 is used to control the frequency of the core portion of the circuitry in processor 401, which is depicted as including processor cores 402 using gray shading. In some embodiments, the Cbo's and LLCs are operated using the core frequency. Under other architectures, the LLC(s) is considered part of the uncore. The remainder of the processor circuitry is considered the uncore, and its frequency is controlled by uncore frequency controller 458. As is known, this does not imply that all of the circuitry in the uncore portion of the processor circuitry operates at the same frequency, as processor typically include frequency dividers that are used to operator some (circuit) blocks at lower frequencies than other blocks. For illustrative purposes, core frequency control block 456 and uncore frequency control block 458 are depicted as separate block, while in practice that may be implemented in other blocks, such as in PCU 452.

PMON blocks 460 are distributed throughout processor 401 and are used to collect various telemetry data associated with the blocks in which the PMON blocks as shown. Generally, telemetry data collected from PMON blocks 460 may be exposed by software (e.g., via an Application Program Interface (API) or the like) running on the system to enable other software to obtain the telemetry data. In some embodiments discussed above, the various RL algorithms are implemented in software via execution of instructions on one or more of the processor cores and access the platform telemetry data via one or more telemetry data APIs.

Telemetry data may also be collected from cores 402 and from one or more I/O devices, such as NICs 446 and 448. Software-based telemetry data may also be used in some embodiments.

In some embodiments, a platform may include a baseboard management controller (BMC) that is used to analyze various telemetry data and provide core and uncore frequency control input signals to control the frequencies of the core and uncore. In the embodiment illustrated in FIG. 4, a BMC 462 is coupled to a low pin count (LPC) bus 564 in IIO block 414. Data and/or signals sent from BMC 462 may send control data and/or signals to PCU 452 or core frequency control block 456 and uncore frequency control block 458 to control the frequency of the core and uncore circuitry.

FIG. 5 shows an overview of a workload feedback mechanism facilitating a closed loop architecture 500 that is used to adjust the core and uncore frequencies. Architecture 500 includes a server platform 502 that included multiple means for generating telemetry data, including cache telemetry logic 504, memory telemetry logic 506, network telemetry logic 508, and PMU 110. The telemetry data generated by the foregoing and potentially other telemetry data sources (not shown) are collected by a telemetry data collection mechanism 512 that provides telemetry data input to a data analytics block 114. Telemetry data is also generated by or collected from a VNF and/or applications, as depicted by VNF telemetry 509 and a workload 516, and forwarded to data analytics block 514. Data analytics block 114 performs data analytics processing of its inputs and provides output data to an a core and uncore frequency configuration block 120, which, in turn, provide control inputs to server platform 102 to adjust the frequency of the core and uncore of the server platforms processor.

In one embodiment telemetry data collection mechanism 112 uses collected. Collected uses plugins for collecting a configurable number of metrics from server platforms and publishes the collected metrics to an analytics component, such as data analytics block 114. The analytics component uses the telemetry information in conjunction with the application telemetry (e.g., VNF telemetry 109) to potentially make changes to the platform (such as core frequency scaling or cache allocation) or to indicate to a scheduler to move a workload, for example.

Among other functions, data analytics block 514 may be used to determine whether workload 516 is uncore sensitive. As discussed above in block 310 of FIG. 3, this determination may be made by observing uncore metrics relating to one or more of NIC statistics, LLC utilization, core-to-core traffic, and memory bandwidth utilization. Non-limiting examples of MC statistics include RX statistics, TX statistics, FIFO overrun, descriptor underruns, buffer underruns, bus telemetry (lanes, throughput, frequency, contention), and interrupt rate. In addition, the workload/application/VNF may participate in the telemetry exposure process. With as simple of a telemetry indication of 'Meeting SLA' or 'Not Meeting SLA' (e.g., as represented by a '1' or '0'), an analytic component will be able to analyze platform and OS telemetry to attempt to find the optimal conditions for the workload. If the telemetry provided by the workload can provide additional reasons as to why it may or may not be meeting SLA's then the analytic component may be able to do an even better job at narrowing down the corresponding platform telemetry. In connection with core and uncore frequency adjustments, for uncore sensitive workloads the uncore frequency may be increased if the SLA is not being met (or otherwise frequency adjustment of the uncore is prioritized over frequency adjustment of the core. For workloads that are not uncore sensitive, both the frequency of the core and uncore may be increased, with the caveat that the logic for handling TDP threshold conditions will still be implemented to ensure the processor stays within TDP limitations.

Figure 6:
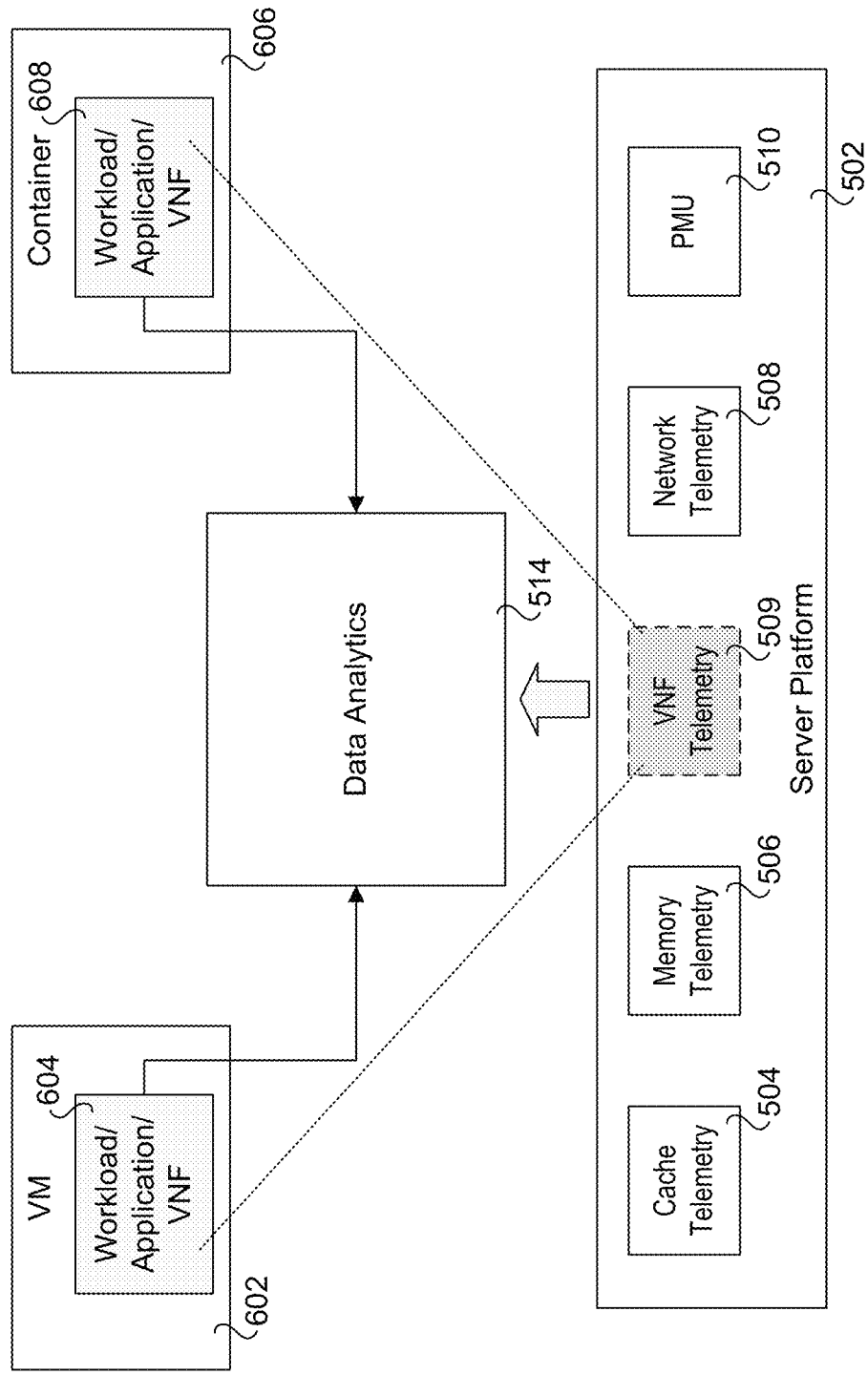
FIG. 6 is a schematic diagram illustrating further details of data analytics and workload aspects of closed loop architecture of FIG. 1, according to one embodiment.

FIG. 6 shows a diagram 600 illustrating further details of workload aspects of closed loop architecture 500. In addition to the components shown in FIG. 5 and discussed above, diagram 600 further shows a VM 602 in which a workload/application/VNF 604 is run and a container 606 in which a workload/application/VNF 608 is run. More generally, a given platform may host multiple VMs or containers in which workloads/applications/VNFs are run. As depicted, data analytics block 514 receives input from each of workload/application/VNF 604 and 608.

Generally, the particular mechanisms by which telemetry and associated data are exposed and in what form the data are exposed is beyond the scope of this disclosure. One or more known mechanisms may be implemented, which may further employ secure network connections and/or out-of-band connections. Platform capabilities such as Hardware Queue Manager (HQM) may also be employed.

Figure 7:
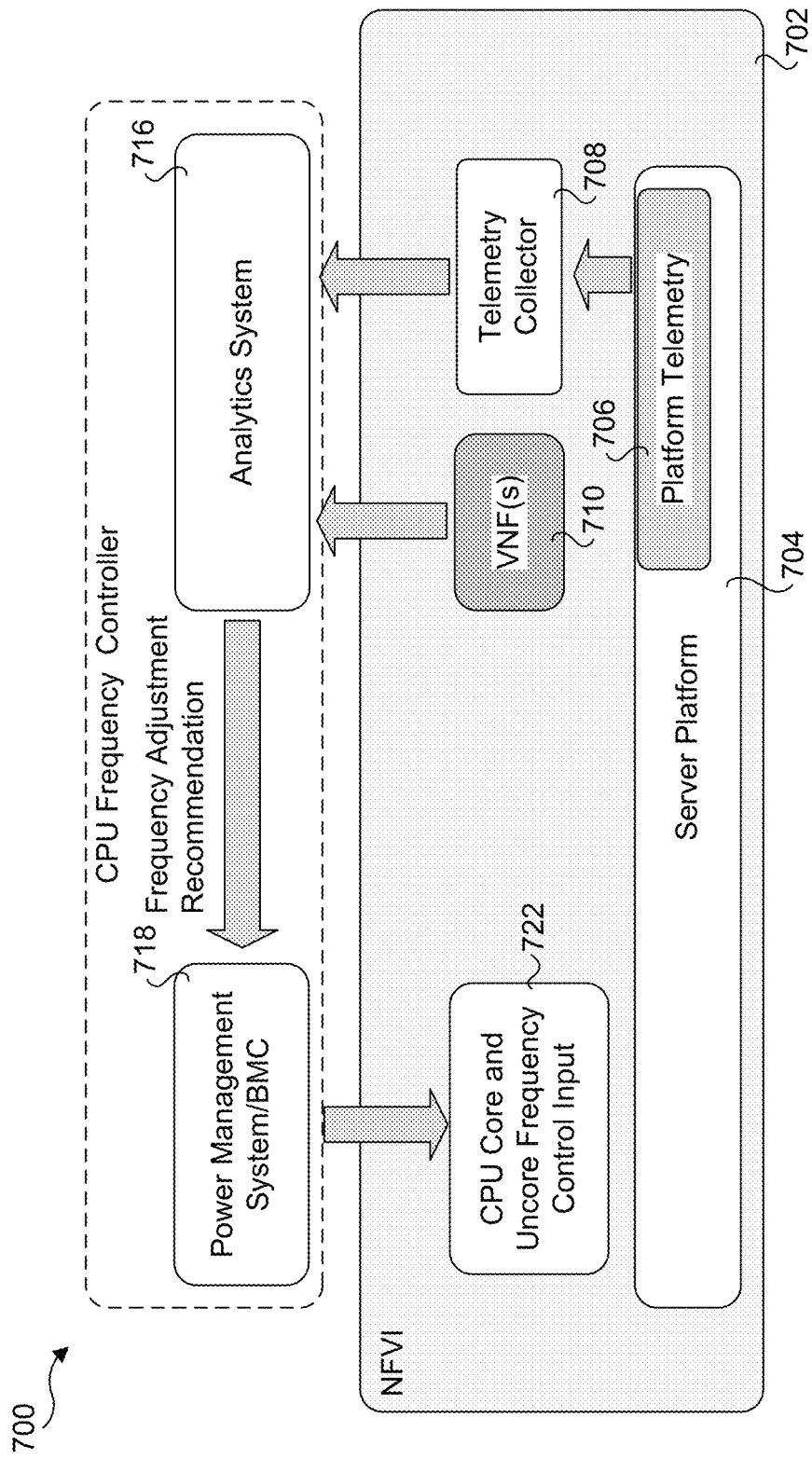
FIG. 7 is a schematic diagram illustrating an architecture for an exemplary NFVI platform with a closed-loop core and uncore frequency control system, according to one embodiment.

FIG. 7 shows an architecture 700 illustrating an exemplary implementation of a platform configured to implement core and uncore frequency control using closed-loop feedback, according to one embodiment. Architecture 700 employs an NFVI (Network Functions Virtualized Infrastructure) 702 having hardware in including a server platform 704 with one or more components generating platform telemetry 706 and software components including a telemetry collector 708 and one or more VNFs 710. Architecture 700 further includes an analytics system 716 and a power management system or BMC 718.

During ongoing (e.g., runtime) operations while a workload performed by VNF(s) 710 is being executed on one or more cores in the CPU of server platform 704, telemetry collector 708 collects telemetry data from platform telemetry 708 and provides (e.g., publishes) the collected telemetry data to analytics system 716. For example, in one embodiment collected is used to publish the collected telemetry data. In some embodiments, VNF(s) 710 also provide performance indicia such as an SLA general indication of SLA performance to analytics system 716. Analytics system 716 processes its inputs to produce a core and uncore frequency adjustment recommendation that is provided to power management system/BMC 718. Power management system/BMC 718 then provides configuration inputs 722 to adjust the CPU core and uncore frequencies of the CPU on server platform 704.

Figure 8:
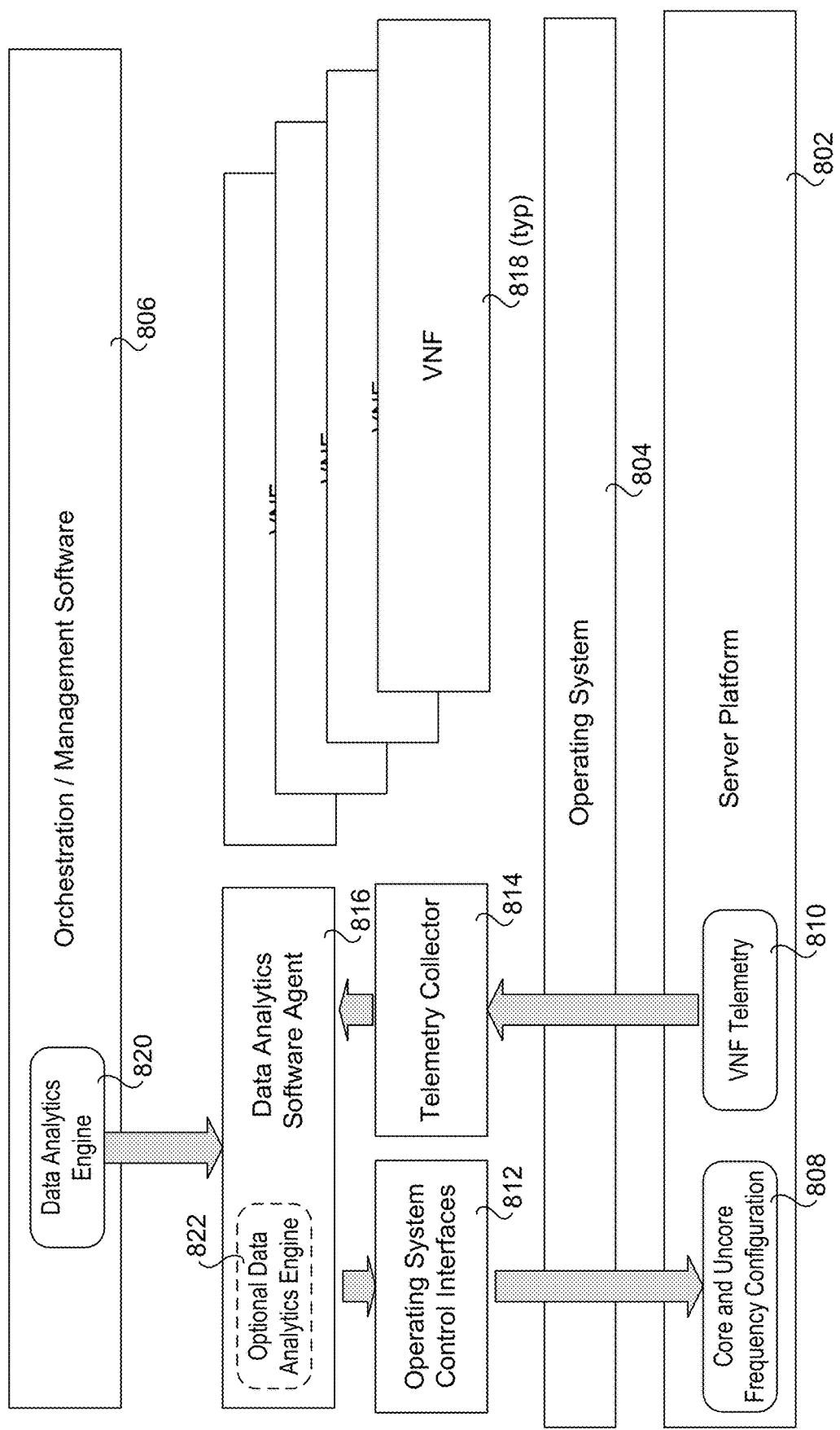
FIG. 8 is a block diagram of an architecture illustrating selected components for implementing aspects of the embodiments described herein.

FIG. 8 shows an architecture 800 illustrating selected components for implementing aspects of the embodiments described above. Architecture 800 includes a server platform 802, an operating system 804, and orchestration/management software 806. Server platform 802 is representative of platform hardware, including a CPU, memory, IO devices, etc. As depicted, server platform 802 further includes core and uncore frequency configuration 808 and VNF telemetry 810. In addition to operating system 804, software running on server platform 802 include operating system and control interfaces 812, telemetry collector 814, a data analytics software agent 816, and one or more VNFs 818. Orchestration/management software 806 includes a data analytics engine 820. Data analytics software agent 816 may also include an optional data analytics engine 822.

In some embodiments orchestration/management software 806 is run on server platform 802. In other embodiments employing a distributed architecture, orchestration/management software 806 runs on a separate server platform that is linked in communication with server platform 802 over a network or other type of communication link. Generally, architecture 800 may be deployed using any of a Type-1 Hypervisor, Type-2 Hypervisor, or container architecture. For simplicity, these aspects of architecture 800 are not shown, but will be recognized by those skilled in the art.

Figure 9:
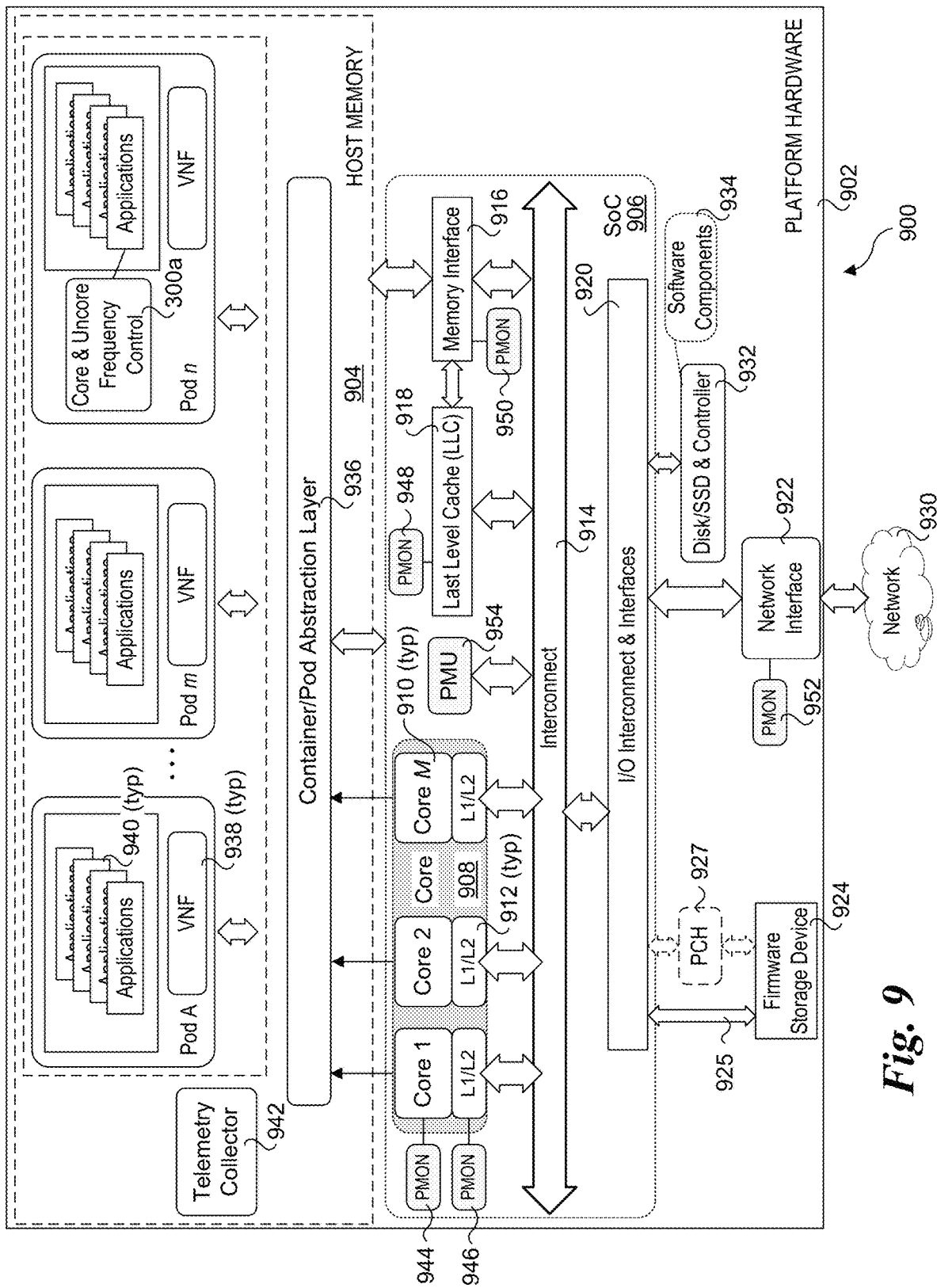
FIG. 9 is a schematic diagram of a server platform configured to implement aspects of the server platforms described and illustrated herein.

FIG. 9 shows an embodiment of a server platform architecture 900 suitable for implementing aspects of the embodiments described herein. Architecture 900 includes a hardware layer in the lower portion of the diagram including platform hardware 902, and a software layer that includes software components running in host memory 904. Platform hardware 902 includes a processor 906 having an SoC architecture including core circuitry 908 with M processor cores 910, each coupled to a Level 1 and Level 2 (L1/L2) cache 912. Each of the processor cores and L1/L2 caches are connected to an interconnect 914 to which a memory interface 916 and a Last Level Cache (LLC) 918 is coupled, forming a coherent memory domain. Interconnect is an abstracted representation of various types of interconnects including ring interconnects and mesh interconnects. Memory interface 916 is used to access host memory 904 in which various software components are loaded and run via execution of associated software instructions on processor cores 910.

Processor 906 further includes an I/O interconnect hierarchy, which includes one or more levels of interconnect circuitry and interfaces that are collectively depicted as I/O interconnect & interfaces 920 for simplicity. Various components and peripheral devices are coupled to processor 906 via respective interfaces (not all separately shown), including a network interface 922 and a firmware storage device 924. In one embodiment, firmware storage device 924 is connected to I/O interconnect via a link 925, such as an Enhanced Serial Peripheral Interface Bus (eSPI). As an option, firmware storage device 924 may be operatively coupled to processor 906 via a platform controller hub (PCH) 927.

Network interface 922 is connected to a network 930, such as a local area network (LAN), private network, or similar network within a data center. For example, various types of data center architectures may be supported including architecture employing server platforms interconnected by network switches such as Top-of-Rack (ToR) switches, as well as disaggregated architectures such as Intel® Corporation's Rack Scale Design architecture.

Platform hardware 902 may also include a disk drive or solid-state disk (SSD) with controller 932 in which software components 934 are stored. Optionally, all or a portion of the software components used to implement the software aspects of embodiments herein may be loaded over a network 930 accessed by network interface 922.

The software components illustrated in FIG. 9 include a container/pod abstraction layer 936 used to host n pods Pod A, Pod B, . . . Pod n, with Pods A, B, m including an VNF 938 implementing one or more applications 940. In one embodiment, the Pods are Kubernetes Pods. Platform architectures employing containers, such as Docker®-type containers, may be implemented in a similar manner. Optionally, platform architectures employing VMs may be implemented using a Type-1 (bare metal) or Type-2 Hypervisor or VMM. The software components also include a telemetry collector 942.

As further illustrated in FIG. 9, platform hardware 902 includes various components for generating telemetry data, as depicted by PMONs (performance monitors) 944, 946, 948, 950, 952 and a PMU 954. Examples of telemetry data include but are not limited to processor core telemetry data, cache-related telemetry data, memory-related telemetry data, network telemetry data, and power data. The cache-related telemetry data may include but is not limited to Cache Monitoring Technology (CMT), Cache Allocation Technology (CAT), and Code and Data Prioritization (CDP) telemetry data. CMT monitors LLC utilization by individual threads, applications, VMs, VNFs, etc. CMT improves workload characterization, enables advanced resource-aware scheduling decisions, aids "noisy neighbor" detection and improves performance debugging. CAT enables software-guided redistribution of cache capacity, enabling VMs, containers or applications to benefit from improved cache capacity and reduced cache contention. CDP is an extension of CAT that enables separate control over code and data placement in the LLC. Certain specialized types of workloads may benefit with increased runtime determinism, enabling greater predictability in application performance.

In one embodiment, PMON 950 implements Memory Bandwidth Monitoring (MBM). MBM enables multiple VMs, VNFs, or applications to be tracked independently, which provides memory bandwidth monitoring for each running thread simultaneously. Benefits include detection of noisy neighbors, characterization and debugging of performance for bandwidth-sensitive applications, and more effective non-uniform memory access (NUMA)-aware scheduling.

In the illustrated embodiment, Pod n is used to host a core and uncore frequency control application 300a that implements the run-time operations and logic of flowchart 300 to optimize power by adjusting the frequency of the core and uncore circuitry on processor 906 in the manner described above. In some embodiments, VNF 938 are deployed to support one or more NFV workloads.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'm', 'n', 'M', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a platform including a processor having a core comprising a first portion of circuitry comprising a plurality of cores and a second portion of circuitry external to the core, comprising:
   determining whether the second portion of circuitry is sensitive to a workload; and
   during runtime execution of the workload on at least a portion of the plurality of cores,
      adjusting a frequency of the second portion of circuitry relative to a frequency of the core as a function of whether the second portion of circuitry is determined to be sensitive to the workload.

2. The method of claim 1, further comprising:
detecting a thermal operating condition of the processor has reached a threshold; and
in response thereto,
when the second portion of the circuitry is determined to be sensitive to the workload, reducing a frequency of the core.

3. The method of claim 1, wherein the second portion of circuitry is determined to not be sensitive to the workload, and wherein in response to detecting a thermal operating condition of the processor has reached a threshold, reducing a frequency of the core and a frequency of the second portion of circuitry.

4. The method of claim 1, wherein the second portion of circuitry includes input/output (I/O) circuitry and the platform includes at least one network interface controller (NIC) coupled to the I/O circuitry, further comprising determining whether the second portion of circuitry is sensitive to the workload by observing one or more NIC statistics during runtime execution of the workload.

5. The method of claim 1, wherein each of the processor cores includes a Level 1 (L1) and a Level 2 (L2) cache operatively coupled to a Last Level Cache (LLC) in the second portion of circuitry, and wherein determining whether the second portion of circuitry is sensitive to the workload comprises observing core-to-core traffic during runtime execution of the workload.

6. The method of claim 1, wherein each of the processor cores includes a Level 1 (L1) and a Level 2 (L2) cache operatively coupled to a Last Level Cache (LLC) in the second portion of circuitry, and wherein determining whether the second portion of circuitry is sensitive to the workload comprises observing LLC utilization during runtime execution of the workload.

7. The method of claim 1, wherein the processor includes a memory controller having one or more memory channels coupled to one or more memory devices, and wherein determining whether the second portion of circuitry is sensitive to the workload comprises observing memory bandwidth utilization during runtime execution of the workload.

8. The method of claim 1, wherein determining whether the second portion of circuitry is sensitive to the workload is performed via execution of software on one or more of the plurality of cores.

9. The method of claim 1, wherein the platform further includes a baseboard management controller (BMC) coupled to the processor, further comprising employing the BMC to adjust frequencies of the core and second portion of circuitry.

10. The method of claim 1, wherein the second portion of the circuitry is sensitive to a workload when the workload places a demand on the second portion of the circuitry that is higher than other non-sensitive workloads at a level where adjusting the frequency of the second portion of the circuitry relative to the core frequency provides a performance improvement.

11. The method of claim 1, wherein the frequency of the core and the frequency of the second portion of circuitry are adjusted independently.

12. A system, comprising:
a processor having,
a core comprising a first portion of circuitry including a plurality of cores; and
a second portion of circuitry external to the core including one or more memory controllers and one or more input/output (I/O) interfaces;
memory, coupled to the one or more memory controllers;
a network interface, coupled to an I/O interface and having one or more ports at which packets are received; and
first and second software configured to be executed on the plurality of cores,
wherein execution of the first software enables the system to perform a workload, and wherein execution of the second software enables the system to adjust a frequency of the core and a frequency of the second portion of circuitry while performing the workload as a function of whether the second portion of circuitry is sensitive to the workload.

13. The system of claim 12, wherein execution of the second portion of software further enables the system to:
determine whether the second portion of circuitry is sensitive to the workload;
detect a thermal operating condition of the processor has reached a threshold; and
in response thereto:
when the second portion of the circuitry is sensitive to the workload, reduce a frequency of the first portion of circuitry.

14. The system of claim 13, wherein the second portion of circuitry is determined to not be sensitive to the workload, and wherein in response to detecting the thermal operating condition of the processor has reached the threshold, a frequency of the core and a frequency of the second portion of circuitry is reduced.

15. The system of claim 12, wherein execution of the second portion of software determines whether the second portion of circuitry is sensitive to the workload by observing at least one statistic for the network interface.

16. The system of claim 12, wherein each of the processor cores includes a Level 1 (L1) and a Level 2 (L2) cache operatively coupled to a Last Level Cache (LLC) in the second portion of circuitry, and wherein execution of the second portion of software determines whether the second portion of circuitry is sensitive to the workload by observing core-to-core traffic.

17. The system of claim 12, wherein each of the processor cores includes a Level 1 (L1) and a Level 2 (L2) cache operatively coupled to a Last Level Cache (LLC) in the second portion of circuitry, and wherein execution of the second portion of software determines whether the second portion of circuitry is sensitive to the workload by observing LLC utilization.

18. The method of claim 12, wherein execution of the second portion of software determines whether the second portion of circuitry is sensitive to the workload by observing memory bandwidth utilization.

19. The system of claim 12, wherein the second portion of the circuitry is sensitive to a workload when the workload places a demand on the second portion of the circuitry that is higher than other non-sensitive workloads at a level where adjusting the frequency of the second portion of the circuitry relative to the core frequency provides a performance improvement.

20. One or more non-transitory machine-readable mediums having first software instructions stored thereon configured to be executed on a processor having a core comprising a first portion of circuitry associated with plurality of cores and a second portion of circuitry external to the core, the processor implemented in a system configured to perform a workload via execution of second software instructions on one or more of the plurality of cores, wherein execution of the first software instructions enables the system to:

during execution of the second software instructions to perform the workload, process telemetry data obtained for the second portion of circuitry of the processor and determine whether the second portion of circuitry is sensitive to the workload;

adjust a frequency of the core and a frequency of the second portion of circuitry while performing the workload as a function of whether the second portion of circuitry is determined to be sensitive to the workload.

21. The one or more non-transitory machine-readable mediums of claim 20, wherein execution of the first software instructions further enables the system to:

detect a thermal operating condition of the processor has reached a threshold or receive a notification the threshold has been reached; and in response thereto, when the second portion of the circuitry is sensitive to the workload, reduce a frequency of the core.

22. The one or more non-transitory machine-readable mediums of claim 21, wherein the second portion of circuitry is determined to not be sensitive to the workload, and wherein execution of the first software instructions further enables the system to:

in response to detecting the thermal operating condition of the processor has reached the threshold or receiving a notification the threshold has been reached, reduce a frequency of the core and a frequency of the second portion of circuitry.

23. The one or more non-transitory machine-readable mediums of claim 20, wherein the system includes a network interface including one or more ports via which network traffic is received and transmitted, a cache hierarchy including a last level cache (LLC), and a memory subsystem, and wherein the telemetry data comprises at least one of:

network receive statistics;
network transmit statistics;
LLC utilization;
core to core traffic; and
memory bandwidth utilization.

24. The one or more non-transitory machine-readable mediums of claim 20, wherein the workload comprises a Network Function Virtualization (NFV) workload and the second software instructions comprise one or more Virtualized Network Function (VNF) application executing in a memory space for one or more virtual machines or one or more containers.

* * * * *